US008688707B2

(12) United States Patent
Marshall et al.

(10) Patent No.: US 8,688,707 B2
(45) Date of Patent: Apr. 1, 2014

(54) MATCHING TOOLS FOR USE IN ATTRIBUTE-BASED PERFORMANCE SYSTEMS

(75) Inventors: James Edward Marshall, Richmond (GB); Marcus Wilfrid Buckingham, Beverly Hills, CA (US); Darren Joseph Raymond, San Diego, CA (US)

(73) Assignee: Accenture Global Services GmbH (CH)

( * ) Notice: Subject to any disclaimer, the term of this patent is extended or adjusted under 35 U.S.C. 154(b) by 0 days.

(21) Appl. No.: 13/193,965

(22) Filed: Jul. 29, 2011

(65) Prior Publication Data

US 2012/0136876 A1 May 31, 2012

Related U.S. Application Data

(63) Continuation of application No. 12/379,766, filed on Feb. 27, 2009, now abandoned.

(51) Int. Cl.
*G06F 17/30* (2006.01)
(52) U.S. Cl.
USPC .......................................................... 707/740
(58) Field of Classification Search
USPC ................................................. 707/749, 740
See application file for complete search history.

(56) References Cited

U.S. PATENT DOCUMENTS

| 5,592,375 | A | 1/1997 | Salamon et al. |
| 5,996,006 | A | 11/1999 | Speicher |
| 6,629,097 | B1 * | 9/2003 | Keith ........................................ 1/1 |
| 8,060,573 | B2 * | 11/2011 | Leonard .......................... 709/206 |
| 2001/0039508 | A1 * | 11/2001 | Nagler et al. .................... 705/11 |
| 2002/0049847 | A1 | 4/2002 | McArdle et al. |
| 2003/0093458 | A1 | 5/2003 | Poindexter et al. |
| 2005/0159970 | A1 | 7/2005 | Buyukkokten et al. |
| 2005/0187956 | A1 * | 8/2005 | Sylvester et al. .............. 707/101 |
| 2010/0125632 | A1 * | 5/2010 | Leonard .......................... 709/204 |
| 2010/0153289 | A1 * | 6/2010 | Schneiderman et al. ..... 705/320 |

\* cited by examiner

*Primary Examiner* — Albert Phillips, III
(74) *Attorney, Agent, or Firm* — Finnegan, Henderson, Farabow, Garrett & Dunner, LLP

(57) ABSTRACT

Systems and methods consistent with the invention relate to matching user attributes. In one exemplary implementation, the system and methods may store predetermined general attribute descriptors reflecting attributes of users generally, receive personal attribute descriptors selected from the predetermined general attribute descriptors as corresponding to attributes of a first user and a second user, receive a rating associated with each received personal attribute descriptor, compare at least one personal attribute descriptor associated with the first user with at least one personal attribute descriptor associated with the second user to determine a descriptor match, and calculate a match score based on the determined descriptor match and the received ratings. In addition, first and second display points may be displayed and may be separated by a one-dimensional display distance that is a function of the calculated match score.

7 Claims, 16 Drawing Sheets

MATCHING TOOLS FOR USE IN ATTRIBUTE-BASED PERFORMANCE SYSTEMS

This is a continuation of application Ser. No. 12/379,766, filed Feb. 27, 2009, now abandoned, and incorporated herein by reference.

BRIEF DESCRIPTION

1. Technical Field

The present invention relates to attribute-based performance systems and, more particularly, to matching tools for use in attribute-based systems.

2. Background

Each person is unique and thus has a unique combination of strengths and weaknesses. Individuals and teams playing to their strengths significantly outperform those who do not. Thus, it is important for each individual to know their strengths and weaknesses, as well as the strengths and weaknesses of the individuals they work with in an organization. Organizations playing to their members strengths and avoiding their weaknesses can thus excel in areas such as profitability, productivity, and employee retention. Organizations may thus benefit by engaging each person's strengths and doing so at a scale across the organization.

If the organization is large, however, it can be difficult to determine each individual's strengths and weaknesses, and to also monitor and update those strengths and weaknesses over time. Furthermore, an organization's large size invariably results in non-standard methodologies for determining strengths and weaknesses, leading to non-uniform and/or faulty data. The lack of a centralized approach also prevents individuals within the organization from having access to and understanding of the strengths and weaknesses of their colleagues when forming new teams or delegating assignments, resulting in an overall weaker organization.

Accordingly, there is a need for improved systems and methods for facilitating strengths-based performance of an organization.

BRIEF SUMMARY

Consistent with an exemplary embodiment of the present invention, there is provided a computer-readable storage medium having instructions which, when executed on a processor, perform a method for matching user attributes, the method comprising storing predetermined general attribute descriptors reflecting attributes of users generally, receiving personal attribute descriptors selected from the predetermined general attribute descriptors as corresponding to attributes of a first user and a second user, receiving a rating associated with each received personal attribute descriptor, comparing at least one personal attribute descriptor associated with the first user with at least one personal attribute descriptor associated with the second user to determine a descriptor match, calculating a match score based on the determined descriptor match and the received ratings, and displaying a first indicator corresponding to the first user at a first display point and displaying a second indicator corresponding to the second user at a second display point, wherein the first and second display points are separated by a one-dimensional display distance that is a function of the calculated match score.

Consistent with a further exemplary embodiment of the present invention, there is provided a system for matching user attributes comprising means for storing predetermined general attribute descriptors reflecting attributes of users generally, means for receiving personal attribute descriptors selected from the predetermined general attribute descriptors as corresponding to attributes of a first user and a second user, means for receiving a rating associated with each received personal attribute descriptor, means for comparing at least one personal attribute descriptor associated with the first user with at least one personal attribute descriptor associated with the second user to determine a descriptor match, means for calculating a match score based on the determined descriptor match and the received ratings, and means for displaying a first indicator corresponding to the first user at a first display point and displaying a second indicator corresponding to the second user at a second display point, wherein the first and second display points are separated by a one-dimensional display distance that is a function of the calculated match score.

Consistent with a still further exemplary embodiment of the present invention, a method is provided for matching user attributes, the method comprising storing predetermined general attribute descriptors reflecting attributes of users generally, receiving personal attribute descriptors selected from the predetermined general attribute descriptors as corresponding to attributes of a first user and a second user, receiving a rating associated with each received personal attribute descriptor, comparing at least one personal attribute descriptor associated with the first user with at least one personal attribute descriptor associated with the second user to determine a descriptor match, calculating a match score based on the determined descriptor match and the received ratings, and displaying a first indicator corresponding to the first user at a first display point and displaying a second indicator corresponding to the second user at a second display point, wherein the first and second display points are separated by a one-dimensional display distance that is a function of the calculated match score.

It is to be understood that both the foregoing general description and the following detailed description are exemplary and explanatory only and are not restrictive of the invention, as claimed. Further features and/or variations may be provided in addition to those set forth herein. For example, the present invention may be directed to various combinations and subcombinations of the disclosed features and/or combinations and subcombinations of several further features disclosed below in the detailed description.

BRIEF DESCRIPTION OF THE DRAWINGS

The accompanying drawings, which are incorporated in and constitute a part of this specification, show certain aspects of the present invention and, together with the description, help explain some of the principles associated with the invention. In the drawings.

DETAILED DESCRIPTION

Reference will now be made in detail to the exemplary embodiments consistent with the present invention. Wherever possible, the same reference numbers will be used throughout the drawings to refer to the same or like parts. It is apparent, however, that the embodiments shown in the accompanying drawings are not limiting, and that modifications may be made without departing from the spirit and scope of the invention.

Systems and methods consistent with the invention provide an attribute-based system for facilitating performance of an organization. To this end, the attribute-based system may collect attribute information about the users of the system. As used herein, the term "attribute" broadly refers to any characteristic, trait, value, or other attribute associated, whether objectively or subjectively, with a user. The detailed description below provides further examples of such attributes. When collecting a user's attribute information, the attribute-based system may receive one or more personal attribute descriptors associated with the user, including a rating assigned to each personal descriptor. Upon receiving such attribute information for a number of users (e.g., members of the organization), the attribute-based system may then determine a match between users of the system, according to a match scoring procedure consistent with the present invention and as described in further detail below. The attribute-based system may then generate an attribute proximity display that graphically or pictorially displays the matches of other users in relation to a particular user.

Figure 1A:
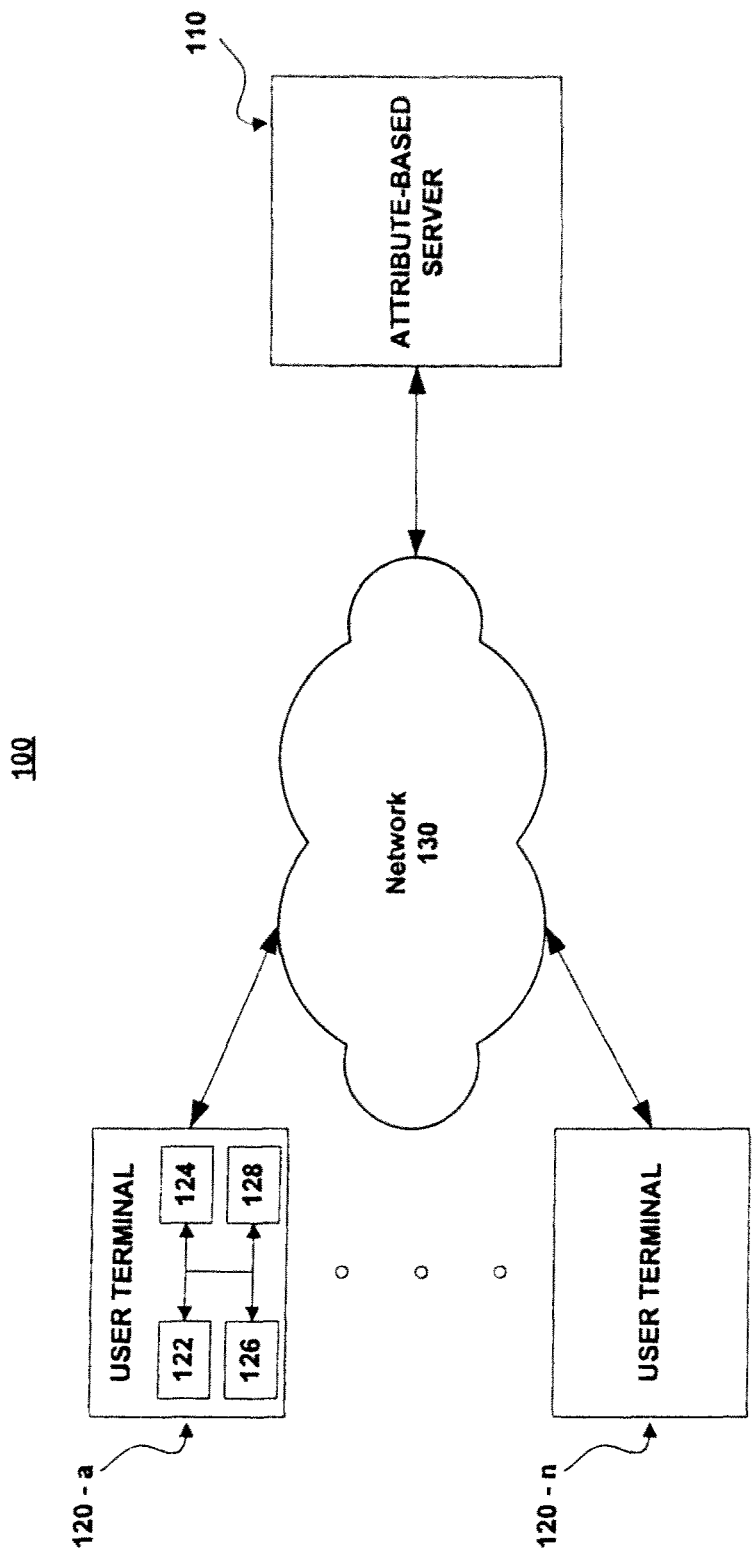
FIG. 1A is a block diagram of an exemplary attribute-based system consistent with the present invention.

FIG. 1A is a block diagram of an exemplary attribute-based system 100 consistent with the present invention. One skilled in the art will appreciate that system 100 may be implemented in a number of different configurations without departing from the scope of the present invention. In the embodiment shown in FIG. 1A, system 100 may include an attribute-based server 110, a plurality of user terminals 120-a to 120-n, and a network 130 for connecting server 110 with terminals 120. While FIG. 1A shows only one attribute-based server 110 and two client terminals 120, system 100 may include any number of servers 110 and terminals 120.

Attribute-based server 110 may be a computing system that performs various functions. In one embodiment, server 110 may be configured to process requests received from user terminals 120-a to 120-n to provide attribute information associated with an organization or respective users, such as members of the organization. In response to user requests, server 110 may display attribute-based data to users of terminals 120-a to 120-n, determine attribute-based matches with respect to others users, store and manage attribute-based data, as well as other functions. The functions performed by attribute-based server 110 are described in greater detail below with respect to, for example, FIGS. 2 to 6.

Each user terminal 120 may be a computing system operated by a user. Terminal 120 may be used to display interface screens requesting attribute data from a user and for sending the requested attribute information to server 110 for processing. As shown in FIG. 1A (for simplicity, in terminal 120-a only), user terminal 120 may include, for example, a processor 122, a memory 124, a display device 126, and an interface device 128. Processor 122 may be one or more processor devices, such as a microprocessor, laptop computer, desktop computer, workstation, mainframe computer, etc., that execute program instructions to perform various functions. Memory 124 may be one or more storage devices that maintain data (e.g., instructions, software applications, etc.) used by processor 122. In one embodiment of the present invention, memory 124 may include browser software that enables user terminal 120-a to 120-n to transmit and retrieve attribute-based data to and from server 110 using a protocol such as HTML. Display device 126 may be any known type of display device that presents information to the user operating terminal 120-a to 120-n. Interface device 128 may be one or more known interface device modules that facilitate the exchange of data between the internal components of user terminal 120-a to 120-n and external components, such as server 110. In addition, interface device 128 may include a network interface device that allows user terminals 120-a to 120-n to receive and send data to and from network 130.

Network 130 may be any type of network that facilitates communication between remote components, such as server 110 and user terminals 120. For example, network 130 may be a local area network (LAN), a wide area network (WAN), a virtual private network, a dedicated intranet, the Internet, and/or a wireless network.

The arrangement illustrated in FIG. 1A is exemplary and system 100 may be implemented in a number of different configurations without departing from the scope of the present invention. For example, components 110 and 120 may be directly connected, as opposed to being connected via network 130. Further, additional components may be included in system 100, such as a connection to other attribute-based systems or databases that may provide attribute information to server 110. In addition, one or more user terminals 120 may be included within attribute-based server 110, thus allowing server 110 to receive requests from a user operating server 110 itself.

Figure 1B:
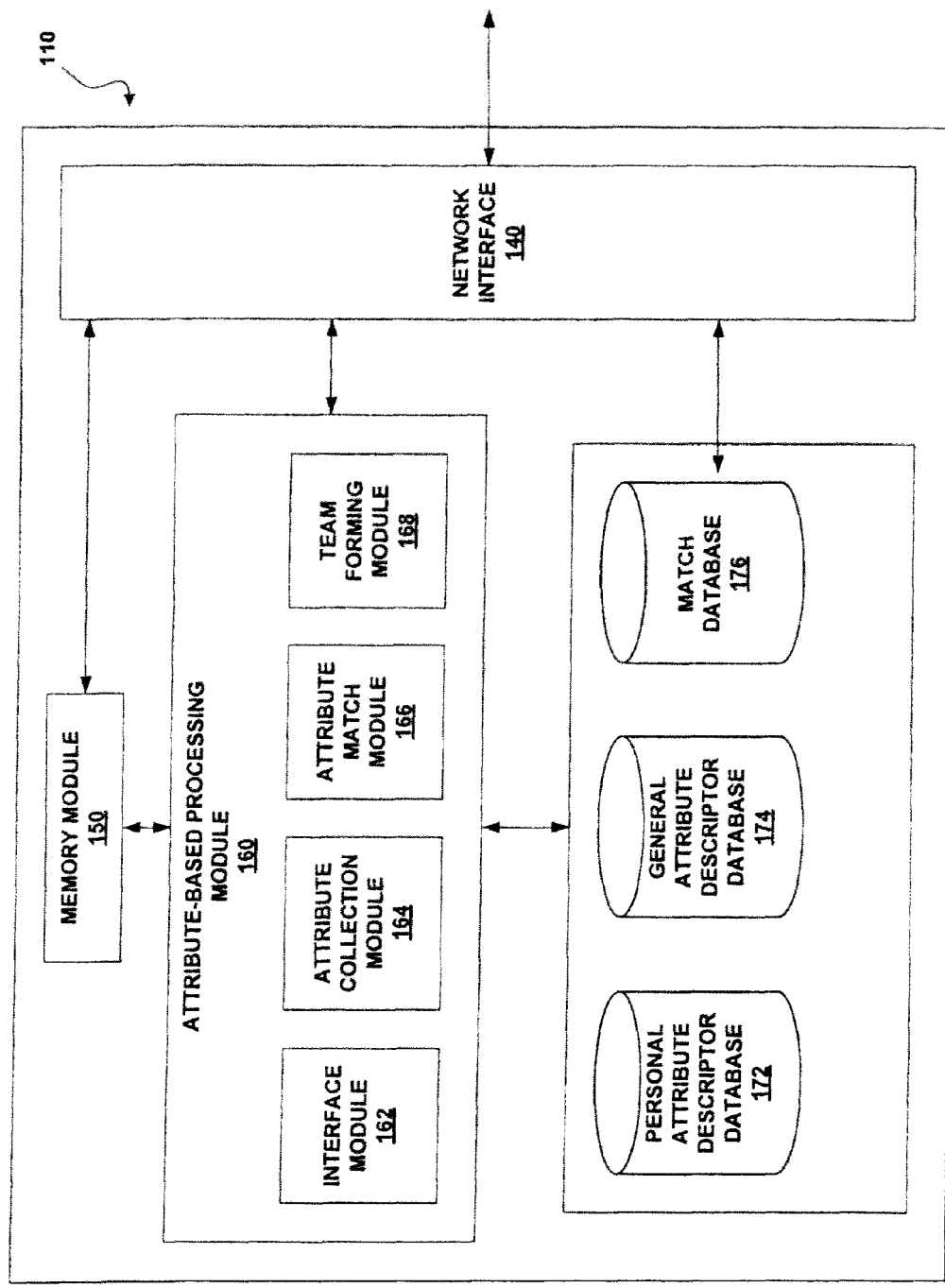
FIG. 1B is a block diagram of an exemplary embodiment of attribute-based server consistent with the present invention.

FIG. 1B is a block diagram of an exemplary embodiment of attribute-based server 110. As shown in FIG. 1B, attribute-based server 110 may further include a network interface 140, a memory module 150, an attribute-based processing module 160, and one or more interconnected information storage databases, such as, for example, a personal attribute descriptor database 172, a general attribute descriptor database 174, and a match database 176. While in the embodiment shown in FIG. 1B the information storage databases are interconnected, each information storage database need not be interconnected. Moreover, rather than separate databases, attribute-based server 110 may include only one database that would include the data of databases 172, 174, and 176.

Network interface 140 may be one or more devices that facilitate the transfer of information between server 110 and external components, such as user terminals 120. Network interface module 140 may receive user requests from terminal 120 and route those requests to processing module 160. In exemplary embodiments, network interface module 140 may be a web server that receives requests from user terminals 120, forwards those requests to processing module 160, and returns the requested results to the requesting terminal 120 in the form of a web page.

Memory module 150 may represent one or more storage devices that maintain information that is used by processing module 160 and/or other components internal and external to attribute-based server 110. Further, memory module 150 may include one or more programs that, when executed by an entity of processing module 160, perform one or more processes consistent with embodiments of the present invention. Examples of such processes are described in greater detail below, with respect to FIGS. 2 to 6. Memory module 150 may also include configuration data that may be used by processing module 160 to present user interface templates or screens to user terminals 120. Examples of such user interface templates or screens are described in greater detail with respect to FIGS. 7 to 12.

Processing module 160, as shown in FIG. 1B, may further include an interface module 162, an attribute collection module 164, an attribute match module 166, and a team forming module 168. Interface module 162 may include components for preparing and presenting user interface templates to terminals 120 via network interface 140. As described above, interface module 162 may retrieve and process configuration data from memory module 150 in presenting user interface templates to user terminal 120 via network interface 140.

Attribute collection module 164 may include components for collecting attribute information about the user. As described in more detail below, attribute information collected by module 164 may include information describing personal attributes, information describing professional attributes, information describing general attributes, or any mix or combination of such attributes. Attribute match module 166 may include components for determining matches between various users based on attributes collected about those users. For example, and as described in greater detail below, attribute match module 166 may include a computer processor for calculating a match score based on the collected attribute information and rankings or other data associated with that information. Team forming module 168 may retrieve and process data from one or more or modules 162, 164, and 166 and/or databases 172, 174, and 176 (described below) to form new teams within an organization or to delegate assignments within current teams.

As shown in FIG. 1B, attribute-based server 110 may also include a plurality of interconnected databases 172 to 176. In this regard, server 110 may include a database module (not shown) having components for controlling access to databases 172 to 176. Such a database module may include a query function that, in response to a match request, may query attribute information stored in one or more of databases 172 to 176 to identify attributes meeting specified criteria. Databases 172 to 176 may be configured using any appropriate type of known storage system configuration that facilitates the storage of data, as well as the locating, accessing, and retrieving of data stored in the databases (e.g., Sybase, Oracle, MySQL, SQL, Access, etc. databases).

General attribute descriptor database 174 may store general attribute descriptors. As used herein, a "general attribute descriptor" broadly refers to any attribute, quality, or characteristic reflecting a user's personal interests, preferences, or personality. For example, a general attribute descriptor may reflect a number of attributes that may be applicable to one or more users, such as types of previously and/or currently held fields of work (e.g., artist), professional and/or personal values (e.g., beauty), task or work experiences (e.g., design a new product), and potential personal and/or professional interests (e.g., collect things).

System 100 may allow a user to select one or more general attribute descriptors from the general attribute descriptor database 174 and to thereby create one or more personal attribute descriptors associated with that user. Personal attribute descriptor database 172 may thus store the personal attribute descriptors that a user selected from the general attribute descriptors. As described in greater detail below, personal attribute descriptor database 172 may also store a corresponding rating given by the user to each personal attribute. As used herein, a personal attribute descriptor is thus a general descriptor that the system 100 associates with a particular user.

Figure 2:
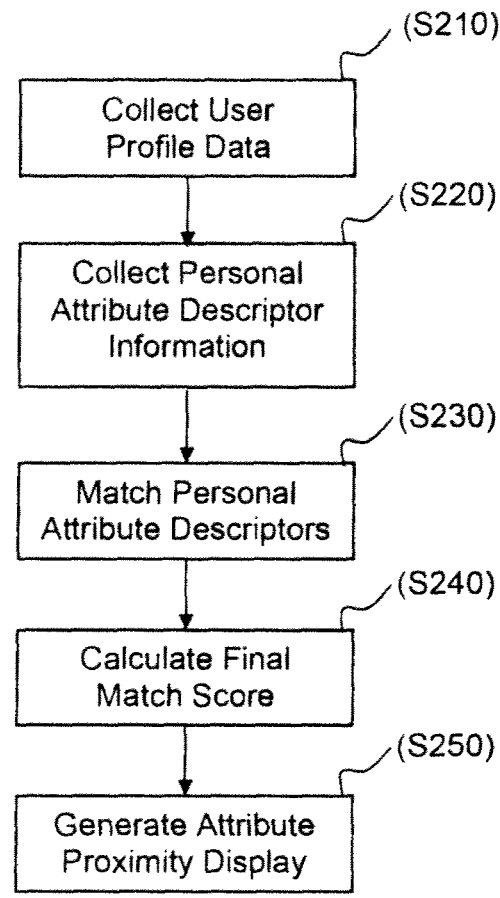
FIG. 2 is a flow-chart demonstrating an exemplary matching process consistent with an exemplary embodiment of the present invention.

FIG. 2 is a flowchart demonstrating an exemplary process for attribute-based matching consistent with the present invention. For example, attribute-based system 100 may use the process of FIG. 2 to match a user's attributes with the attributes of other users in an organization. As shown in FIG. 2, the process may begin by attribute collection module 162 collecting user profile data related to the user (S210). The user profile data may relate to general information about the user. For example, the collected user profile data may include information about the user's current position within the organization, age, level of responsibility, etc. In exemplary embodiments, the user profile data may also relate to tasks that focus the user, tasks that the user is paid to do, or tasks that the user actually does do within the organization. In exemplary implementations, system 100 may collect the user profile data by asking users to respond to queries, which may be predefined by server 110.

Attribute collection module 164 may then collect attribute information, such as personal attribute descriptor information associated with the user (S220). The personal attribute descriptor information may relate to the user's professional and/or personal experience, values, and interests. In exemplary implementations, system 100 may collect the personal attribute descriptor information by asking users to respond to queries, which may be predefined by attribute-based server 110. Upon receiving the personal attribute descriptor information, server 110 may then store the personal attribute descriptor information in database 172.

After storing the personal attribute descriptor information in database 172, attribute match module 166 may determine whether the user's personal attribute descriptor information matches that of other users of system 100 (S230). In exemplary embodiments, matches determined by attribute match module 166 do not necessarily require an exact match between each of the selected personal attribute descriptors. For instance, and as described in further detail below, server 110 may identify relative matches, which may indicate the degree to which a particular user's personal attribute descriptor information matches the personal attribute descriptor information of other users.

In this regard, attribute match module 166 may thus determine a final match score (S240) which may be stored in match database 176. More specifically, the match score may identify or reflect the extent to which the user's attribute information matches the attribute information of one or more other users. In some implementations, the final match score is a percentage. For example, a final match score of 100% may indicate a complete or exact match between all personal attribute descriptors, while a final match score of 50% may indicate that only half of a user's personal attribute descriptors match those of another user. Server 110 may store the final match score in match database 176 and may use it for generating an attribute proximity display on or at a user terminal 120 via network interface 140 (S250).

System 100 may implement the process of FIG. 2 on an organization-wide basis so that the organization may monitor its members attribute-based information for purposes of strength-based performance. For example, system 100 may perform stages 210 to 230 for a large number of members of the organization and then use the final match scores determined at stage 240 when forming new teams or other work groups or in delegating assignments. For example, team forming module 168 may organize a team with the same or complimentary personal and/or professional values reflected by final match scores as determined above. As another example, team forming module 168 may group users based on tasks that they enjoy and/or their personal and professional values.

To these ends, a set of specific tasks required by a project could thus be inputted into system 100. Team forming module 168 could then access personal attribute descriptor database 172 and search for personal attribute descriptors applicable to each task. Team forming module 168 may then access, for example, match database 176 to determine the final match scores for each user whose personal attribute descriptors are applicable to each task, and form a team based not only on the task at hand, but on the degree to which the user's attribute information matches the attribute information of one or more potential teammates.

Figure 3:
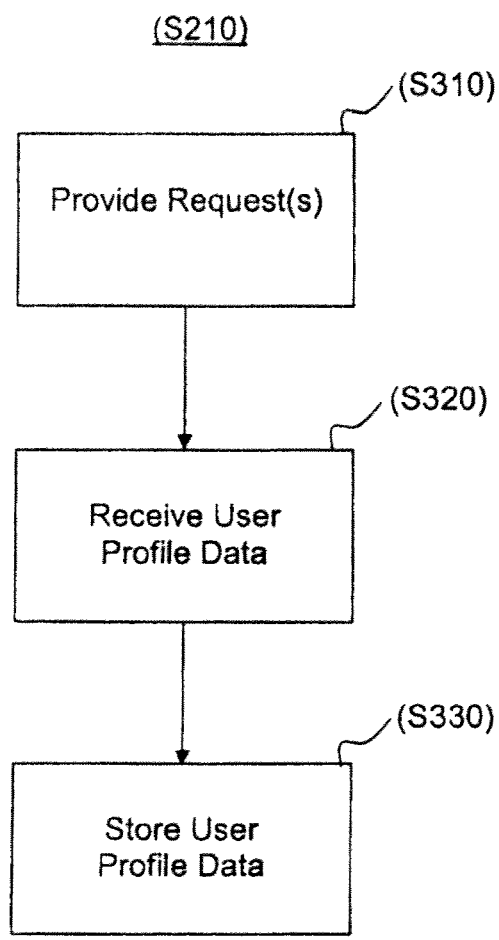
FIG. 3 is a flow-chart demonstrating an exemplary process for collecting user profile data consistent with an exemplary embodiment of the present invention.

The above stages of FIG. 2 are described in greater detail below with respect to FIGS. 3 to 6. Referring now to FIG. 3, it illustrates an exemplary process for implementing stage 210 of collecting the user profile data. As shown in FIG. 3, server 110 may provide the terminal 120 of the user with one or more prompts or requests for user profile data (S310). Subsequently, the user inputs information into terminal 120 that may be responsive to the prompts. For example, terminal 120 may provide a user interface template, such as a screen, that prompts the user regarding tasks that focus the user. The user may then utilize the terminal 120 to input responsive user profile data such as, for example, the user's current work tasks (e.g., "working on game interface design"). In response, attribute collection module 162 may receive the user profile data (S320), and attribute collection module 162 may then store it in one of databases 172 to 176 (S330). The user profile data may also relate to the user's current professional position so that other users of the system could view what the user is currently working on. Exemplary user profile date may also relate to tasks that focus the user, tasks that the user is paid to do, and tasks that the user actually does.

Figure 4:
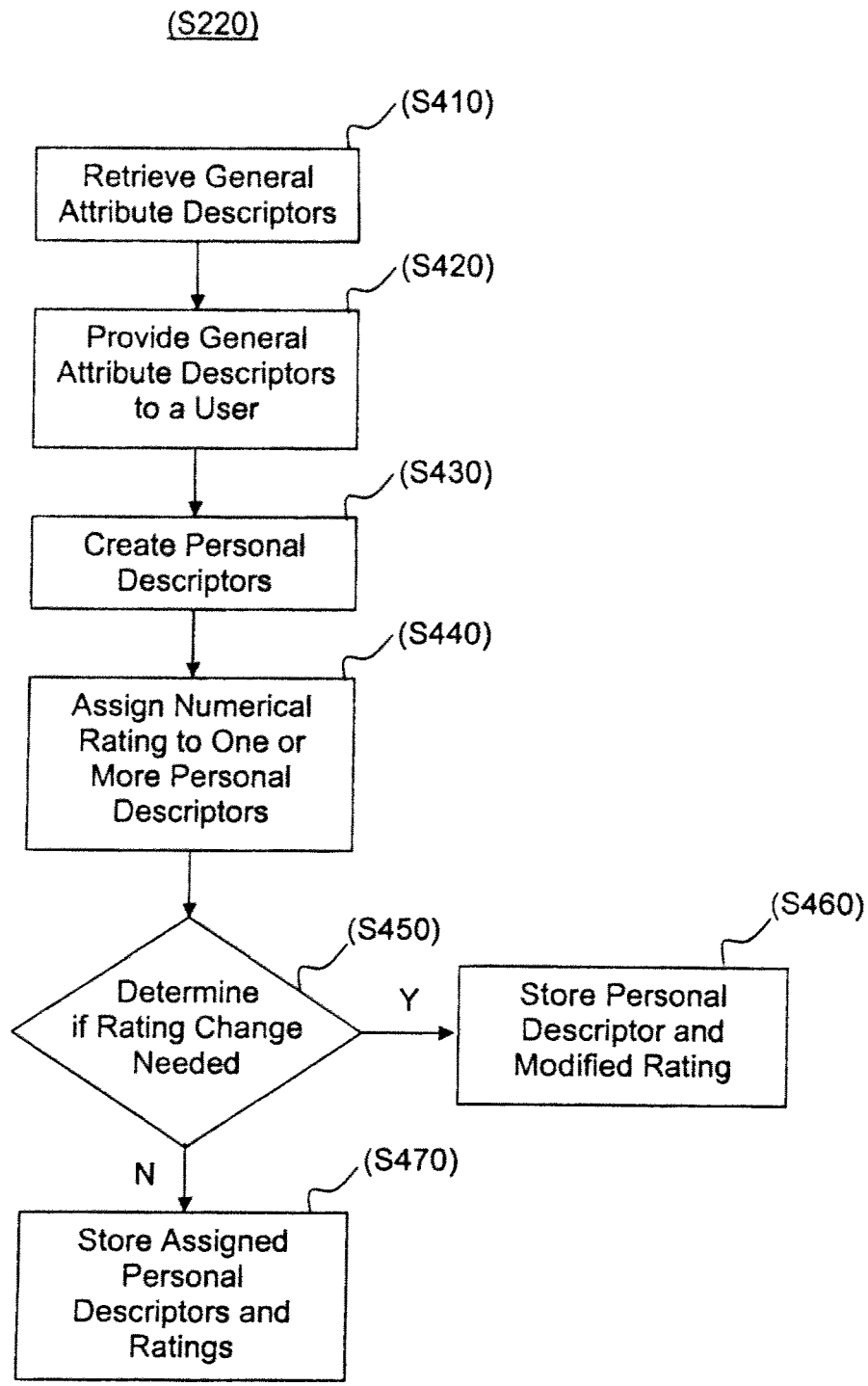
FIG. 4 is a flow-chart demonstrating an exemplary process for collecting personal attribute descriptor information consistent with an exemplary embodiment of the present invention.

FIG. 4 illustrates an exemplary process for collecting personal attribute descriptor information as described above with respect to stage S220 of FIG. 2. As shown in FIG. 4, attribute collection module 164 may retrieve pre-defined general attribute descriptors (S410) from, for example, database 174, and provide or display these descriptors to the user via network interface 140 and terminal 120 (S420).

The general attribute descriptors stored in database 174 may define display items describing, or that prompt the user to describe, a particular attribute. For example, the general attribute descriptors may reflect characteristics, traits, statements, questions, instructions, topics, etc. that may reflect a particular attribute for selection by a user and for entering into system 100. In some implementations, general attribute descriptor database 174 may include a list of pre-defined general attribute descriptors which may be organized by a variety of different attribute categories. Examples of such attribute categories may include "What I Love to Do," "Fields I've Worked In," "My Values," and "What I've Done." For each attribute category, server 110 may provide one or more predefined general attribute descriptors for selection by the user. Table 1 includes a list of exemplary pre-defined general descriptors for the above exemplary categories.

TABLE 1

| Fields I've Worked In | Values | What I've Done | What I Love to Do |
| --- | --- | --- | --- |
| Accountant/auditor | Achievement | Always followed up | Always follow up |
| Actuary | Altruism | Arranged it right | Arrange it right |
| Advertising agent, promoter, manager | Ambition | Balanced the numbers | Balance the numbers |
| Agricultural worker | Authenticity | Beat resistance to ideas | Be available 24/7 |
| Appraiser | Beauty | Been available 24/7 | Be the optimist |
| Astronomer | Camaraderie | Been the realist | Be the realist |
| Athlete/sports competitor | Change | Cared for the sick | Beat resistance to ideas |
| Automotive worker | Community | Challenged people | Care for the sick |
| Banker/teller | Competition | Coached the best | Coach the best |
| Computer operator/technician | Creativity | Coached the strugglers | Coach the strugglers |
| Concierge | Curiosity | Collected things | Collect things |
| Construction worker | Discipline | Crafted a clear vision | Craft a clear vision |
| Correctional officer/jailer | Diversity | Design a new product | Design a new product |
| Court, municipal, license worker | Faith | Design a new process | Design new processes |
| Credit analyst, clerk | Family | Felt others' feelings | Energize my team |
| Decorator/designer | Fun | Figured someone out | Feel others' feelings |
| Dentist, hygienist, assistant | Innovation | Forced others to act | Figure someone out |
| Door-to-door salesperson | Learning | Found common ground | Find common ground |
| Economist | Optimism | Found patterns in data | Find patterns in data |
| Editor | Passion | Found the answer | Find the answer |
| Electrician | People | Got right to the core | Force others to act |
| Emergency service worker | Quality | Got up to speed fast | Get right to the core |
| Engineer (aerospace, civil, mechanical, technical) | Relationships | Learned a new skill | Get up to speed fast |
| Lawyer/legal worker | Results | Let others be heard | Learn a new skill |
| Librarian | Simplicity | Made friends of colleagues | Let others be heard |
| Loan worker | Spirituality | Made people think | Make colleagues friends |
| Machinist | Teamwork | Made powerful speeches | Make many people laugh |
| Maritime | Trust | Made things right | Make people think |

TABLE 1-continued

| Fields I've Worked In | Values | What I've Done | What I Love to Do |
|---|---|---|---|
| Marketing manager | | Make many people laugh | Make powerful speeches |
| Tax preparer, examiner, collector | | Organized a mess | Make things right |
| Teacher/educator | | Outperformed my peers | Organize a mess |
| Travel agent | | Overachieved | Outperform my peers |
| TV, video, film worker | | Painted the future | Overachieve |
| Veterinarian/zoologist | | Persuaded | Paint the future |
| Writer/author | | Planned a contingency | Persuade |
| Postal service worker | | Played politics | Plan a contingency |
| Property/real estate manager | | Raised success higher | Play politics |
| Psychiatrist | | Re-energized a team | Raise success higher |
| Public relations specialist | | Resolved conflict | Resolve conflict |
| TV, video, film worker | | Wrote creatively | Write creatively |

For each category, server 110 may prompt the user to review the corresponding general attribute descriptors and select one or more applicable to the user, thus creating a set of personal descriptors for the particular user (S430). Attribute collection module 164 may then assign an initial rating (e.g., between 1 and 100) to each personal descriptor (S440).

Attribute collection module 164 may also determine whether the user has modified the rating assigned to each personal descriptor (S450). For example, server 110 may generate a display at terminal 120 that includes a personal descriptor area (not shown) into which the user may drag and drop one of the general attribute descriptors to make that descriptor a personal attribute descriptor associated with the user. In such an implementation, the user, through terminal 120, could modify a descriptor's rating by modifying the descriptor's position within the personal descriptor area. The user could thus increase the rating by positioning the personal descriptor towards the top of the personal descriptor area and decrease the rating by moving the personal descriptor towards the bottom of the personal descriptor area. As another example, the user could use terminal 120 to input a new rating entirely.

Attribute collection module 164 may then store the personal attribute descriptors and their corresponding ratings in personal attribute descriptor database 172 (S460). Database 172 may thus include the personal attribute descriptors and associated numerical ratings of one or more users of attribute-based system 100.

Figure 5:
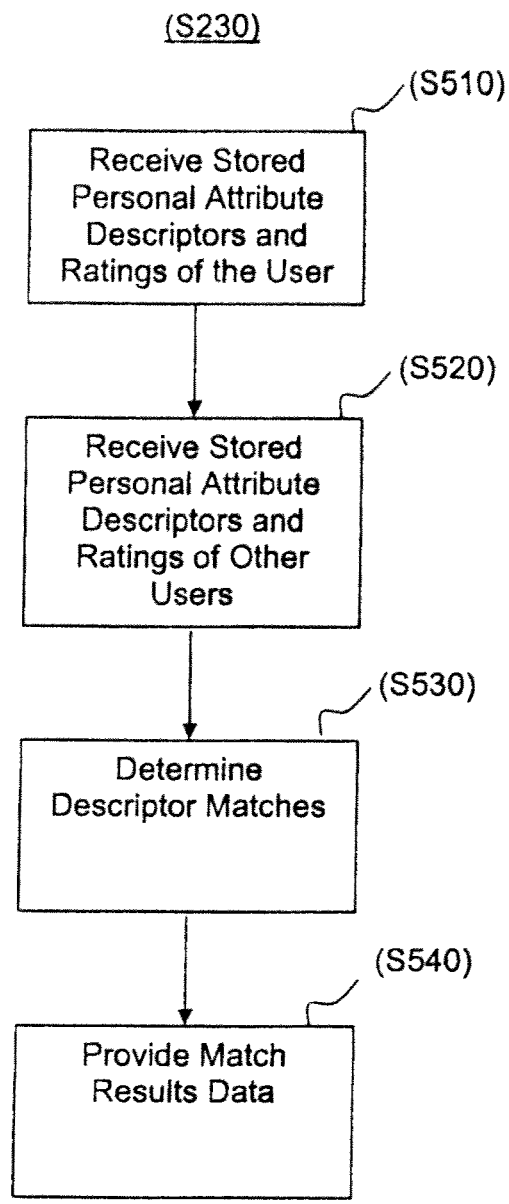
FIG. 5 is a flow-chart demonstrating an exemplary process for matching personal attribute descriptors consistent with an exemplary embodiment of the present invention.

FIG. 5 illustrates an exemplary process for matching personal attribute descriptors as described above with respect to stage S230 of FIG. 2. As shown in FIG. 5, attribute match module 166 may retrieve, for a particular user, the user's stored personal attribute descriptors and the corresponding ratings of those descriptors stored in database 172 (S510). Similarly, match module 166 may retrieve the personal attribute descriptors and ratings associated with the other users of system 100 (S520). Match module 166 may then identify any personal attribute descriptors chosen by two or more users (S530). A personal descriptor chosen by two or more users may be considered a descriptor match. Match module 166 may then provide data reflecting the results of the descriptor matches to match database 176 for storage and/or to attribute match module 166 for processing (S540).

Figure 6:
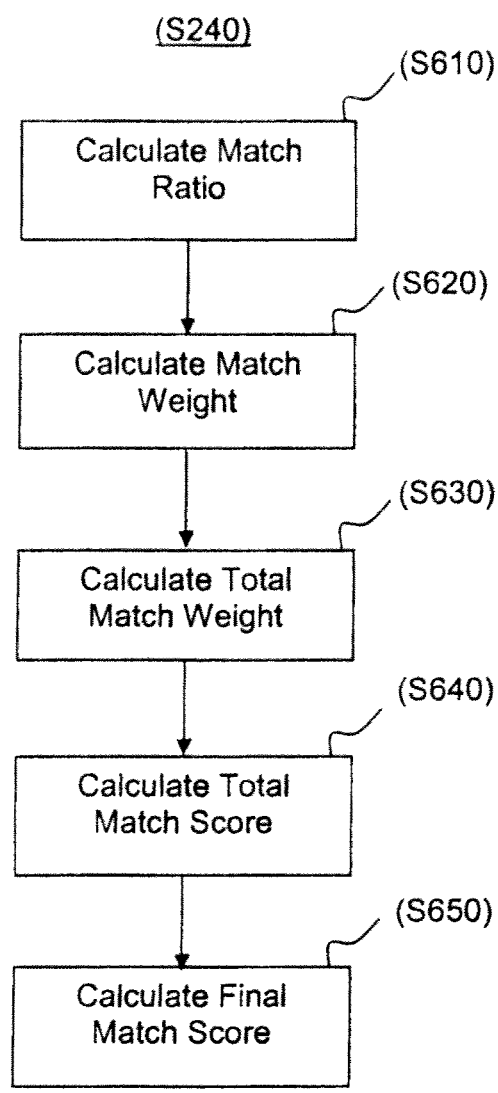
FIG. 6 is a flow-chart demonstrating an exemplary process for calculating a final match score consistent with an exemplary embodiment of the present invention.

FIG. 6 illustrates an exemplary process for determining a match score as described above with respect to stage S240 of FIG. 2. The match score may represent the degree or extent to which a particular user's attribute(s) match those of another user of system 100. As shown in FIG. 6, processing module 160 may calculate the match score by first calculating a match ratio (S610) for each attribute category. The match ratio may reflect a proportion of descriptor matches with respect to the number of personal attribute descriptors associated with the two users. For example, the match ratio may be determined by doubling the total number of descriptor matches divided by the total number of personal attribute descriptors selected by both users, as represented by equation (1):

$$\text{Match Ratio} = 2 \times \frac{\text{Total Number of Descriptor Matches}}{\text{Total Number of Personal Attribute Descriptors}} \quad (1)$$

wherein,

Total Number of Descriptor Matches is the number of personal attribute descriptor matches between a first user and a second user in a particular category; and Total Number of Personal Attribute Descriptors is the sum of the number of personal attribute descriptors selected by the first and second users in the particular category.

Attribute-based processing module 160 may also calculate a match weight for each descriptor match in each category (S620). The match weight may reflect the relative importance of a particular descriptor's match between the first user and the second user. For example, the match weight for a particular descriptor may be determined by using the exemplary formula represented by equation (2):

$$\text{Match Weight} = [\text{Max Rating}] - [\text{Higher Value} - \text{Lower Value}] \quad (2)$$

wherein,

Max Rating is the maximum possible rating that the first or second users may assign to the personal descriptor (e.g., the maximum number on the rating scale);

Higher Value is the greater of the first and second users' rating of the particular personal descriptor; and Lower Value is the lesser of the first and second users' rating of the particular personal descriptor.

If there are multiple descriptor matches between the two users in any one category, then attribute-based processing module 160 may calculate the Match Weight for each match. Processing module 160 may then sum or accumulate the Match Weight for each match to calculate a Summed Match Weight.

Attribute-based processing module 160 may then calculate a total match weight for each category (S630). The total match weight may reflect a proportion of the relative importance of all descriptor matches between the first and second users with respect to the number of personal attribute descriptors associated with those two users. For example, the total match weight may be determined by using the exemplary formula represented by equation (3):

$$\text{Total Match Weight} = 2 \times \frac{\text{(Summed Match Weight)}}{\text{Total Number of Personal Attribute Descriptors}} \quad (3)$$

Attributes-based processing module 160 may also calculate the total match score for each category (S640). The total match score may reflect the degree or extent of any matching personal descriptors between the first and second users in a category. For example, the total match score may be determined by using the exemplary formula represented by equation (4):

$$\text{Total Match Score} = \frac{\text{(Total Match Weight + Match Ratio)}}{2} \quad (4)$$

If the first and second users selected personal attribute descriptors from multiple attribute categories, then attribute-based processing module 160 may calculate the Total Match Score for each category. Processing module 160 may then sum or accumulate the Total Match Weight for each category to thereby calculate a Summed Total Match Score.

Attribute-based processing module 160 may then calculate the Final Match Score for all categories (S650). The Match Score may reflect, as described above, the degree or extent of any matching personal descriptors between the first and second users, and may be based on the determined descriptor matches and the received ratings. For example, the Match Score may be determined by using the exemplary formula represented by equation (5)

$$\text{Final Match Score} = \frac{\text{(Summed Total Match Score)}}{\left(\begin{array}{c}\text{Total Number of Categories}\\ \text{Chosen for Match Calculation}\end{array}\right)} \quad (5)$$

The above calculations of attribute-based processing module 160 are only exemplary, and processing module 160 need not complete each of the above calculations to calculate the final match score. Furthermore, systems consistent with the invention need not perform the above calculations in the order described above and as shown in FIG. 6.

To further illustrate the match calculations performed by processing module 160, two examples will now be described. In the first example, User A and User B select personal attribute descriptors in a single category. Using a scale of 1 to 100, processing module 160 may thus receive from User A the rating of 70 for the personal descriptor "Achievement." User B, however, may rate the personal descriptor "Achievement" as 50. In this example, there are no other descriptor matches between User A and User B, although User A selected two additional personal descriptors in the single category.

Attribute-based server 110 may thus perform the following calculations:

$$\text{Match Ratio} = 2 \times \frac{\text{Total Number of Descriptor Matches}}{\text{Total Number of Personal Attribute Descriptors}}$$

Match Ratio=2×[1/[3+1]]=½=50%

Match Weight=[Max Rating]−[Higher Value−Lower Value]

Match Weight=100−(70−50)=80

$$\text{Total Match Weight} = 2 \times \frac{\text{(Summed Match Weight)}}{\text{Total Number of Personal Attribute Descriptors}}$$

Total Match Weight=2×80/[3+1]=40

$$\text{Total Match Score} = \frac{\text{(Total Match Weight + Match Ratio)}}{2}$$

Total Match Score=(40+50)/2=45

$$\text{Final Match Score} = \frac{\text{(Summed Total Match Score)}}{\text{(Total Number of Categories Chosen for Match Calculation)}}$$

Final Match Score=45/1=20.25

As another illustrative example, suppose user A wishes to search for descriptors in two categories (Cat. 1 and Cat. 2). Using a scale of 1 to 100, attribute-based server 110 receives the following personal descriptors and associated ratings from Users A and B:

| User A | User B |
|---|---|
| Athlete/sports competitor - 20 (Cat. 1) | Banker/Teller - 80 (Cat. 1) |
| Banker/teller - 30 (Cat. 1) | Appraiser - 5 (Cat. 1) |
| Concierge - 30 (Cat. 1) | Authenticity - 90 (Cat. 2) |
| Beauty - 27 (Cat. 2) | Change - 15 (Cat. 2) |
| Change - 40 (Cat. 2) | Passion - 60 (Cat. 2) |
|  | Quality - 95 (Cat. 2) |
|  | Beauty - 85 (Cat. 2) |

The descriptor match in category 1 is "Banker/teller," and the descriptor matches in category 2 are "Beauty" and "Change." Accordingly, attribute-based server 110 may thus perform the following calculations:

$$\text{Match Ratio} = 2 \times \frac{\text{Total Number of Descriptor Matches}}{\text{Total Number of Personal Attribute Descriptors}}$$

Match Ratio Cat 1=2×[1/(3+2)]=⅖=40%

Match Ratio Cat 2=2×[2/(2+5)]=4/7≈57⅐%

Match Weight=[Max Rating]−[Higher Value−Lower Value]

Match Weight "Banker/teller"=100−(80−30)=50

Match Weight "Beauty"=100−(85−27)=42

Match Weight "Change"=100−(40−15)=75

Summed Match Weight Cat. 1=50

Summed Match Weight Cat. 2=117

$$\text{Total Match Weight} = 2 \times \frac{\text{(Summed Match Weight)}}{\text{Total Number of Personal Attribute Descriptors}}$$

Total Match Weight Cat. 1=2×[50/(3+2)]=20

Total Match Weight Cat. 2=2×[(117)/(2+5)]=33 3/7

$$\text{Total Match Score} = \frac{\text{(Total Match Weight + Match Ratio)}}{2}$$

Total Match Score Cat. 1=(20+40)/2=30

Total Match Score Cat. 2=(33 3/7+57 1/7)/2=45 2/7

Summed Total Match Score=30+45 2/7=75 2/7

$$\text{Final Match Score} = \frac{\text{(Summed Total Match Score)}}{\text{(Total Number of Categories Chosen for Match Calculation)}}$$

Final Match Score=(75 2/7)/2=37 9/14 or approximately 37.64

After calculating the final match score, processing module 160 may transmit the match results to client terminal(s) 120 for display through, for example, an attribute proximity display.

Figure 7:
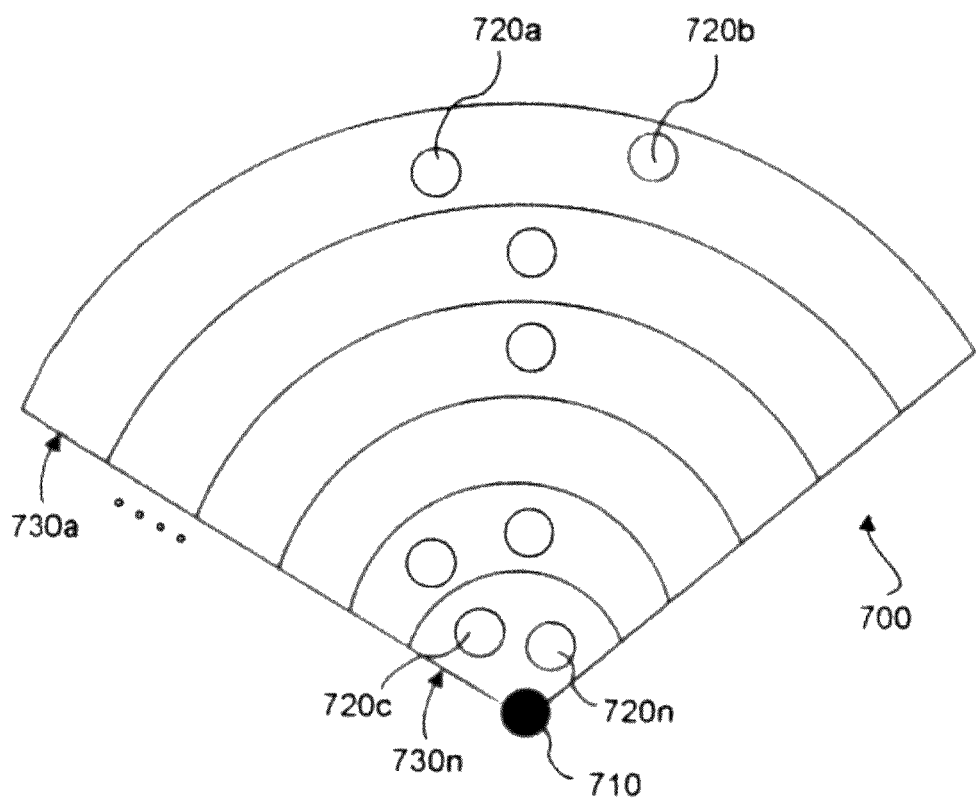
FIG. 7 is an exemplary embodiment of an attribute proximity display consistent with an exemplary embodiment of the present invention.

FIG. 7 illustrates an exemplary attribute proximity display 700 for displaying match results determined by attribute-based server 110. As shown in FIG. 7, attribute proximity display 700 may graphically depict attribute-based information of system 100 in a way that aids the user in quickly finding others sharing similar or complimentary traits or attributes. For example, as shown in FIG. 7, attribute proximity display 700 may be radar-shaped and may indicate a user at the origin of the radar-shape by use of a user indicator 710. Fanning out from the origin are one or more user match indicators 720a-n distributed in one of several ranges 730a-n. Server 110 may place the user match indicators 720 in the range corresponding to that user's final match score calculated by attribute match module 166. In the exemplary implementation shown in FIG. 7, the match indicators 720 in ranges 730 closest to the user indicator 710 represent a higher final match score, while those that farther away represent a lower final match score. Furthermore, user match indicator 720a within range 730a is closer to user indicator 710 than user indicator 720 b and thus represents a higher final match score.

If more than one user has the same final match score, server 110 may use a simple centering procedure to space the users on the range 730 corresponding to the final match score. Accordingly, attribute-based server 110 may display the graphical indicators 720 in only one dimension (as determined by the final match score) in relation to the particular user 710. In other words, user indicator 110 may be separated from user match indicators 720 by a one-dimensional display distance that is a function of the calculated final match score.

Attribute-based server 110 may also limit the number of user match indicators 720 displayed and/or may display user match indicators 720 according to a certain selection criteria. For example, a user may instruct server 110 to limit the user match indicators 720 to those residing in a particular area, or may only wish to display user match indicators 720 based on a certain category. Server 110 may also display, via attribute proximity display 700, information relating to the users corresponding to match indicators 720. For example, display 700 may include overlaid textual or image information about a respective user over indicators 720. The overlaid information may include, for instance, the user profile data collected during stage S210.

Finally, while not shown in FIG. 7, attribute proximity display 700 may include other information stored by server 110. For example, attribute proximity display 700 could display the user profile data, personal descriptors, and/or user account information for each match indicator. In addition, the attribute proximity display 700 could include a "zoom" function such that the user could focus more closely on certain areas of the attribute proximity display 700 and scroll through large user populations when, for example, viewing the entire population on the attribute proximity display 700 would be impractical.

Figure 8A:
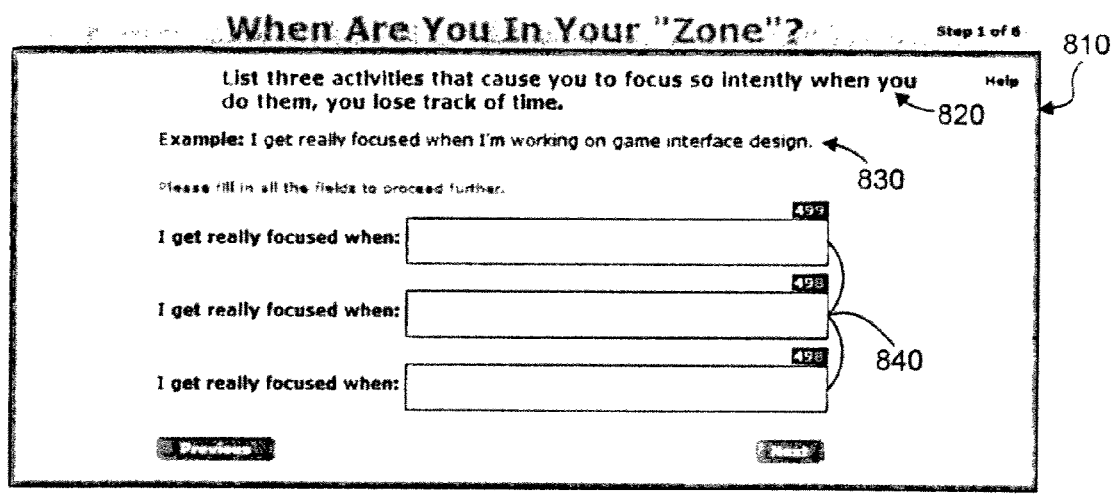
FIGS. 8A-12 are exemplary user display screens consistent with an exemplary embodiment of the present invention.
Figure 8B:
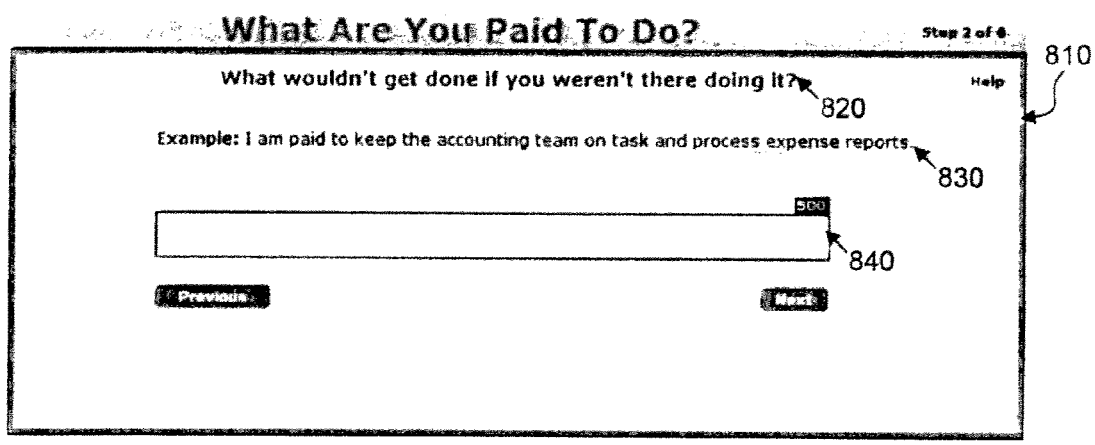

FIGS. 8A-12 are exemplary screenshots consistent with an exemplary embodiment of the present invention. For example, FIGS. 8A-8B illustrate how attribute collection module 164 may display one or more data collection screens 810 to collect user profile data. The data collection screen 810 may include one or more data request areas 820 indicating the type of data requested, a sample response 830 to guide the user in completing the data request, and one or more text entry boxes 840 in which the user can submit his or her user profile data. While in this embodiment data request areas 820 illustrate three exemplary requests, systems consistent with the invention may pose any number of requests, and in a variety of formats, for obtaining user profile data. For example, instead of text-entry boxes, server 110 may prompt the user to select a check box or the like. As another example, users may submit a single word instead of an entire sentence to respond to a data request. After reviewing the data request in data request areas 820 and/or the sample response 830, the user may use text entry boxes 840 to enter and submit the user profile data to server 110.

Figure 9:
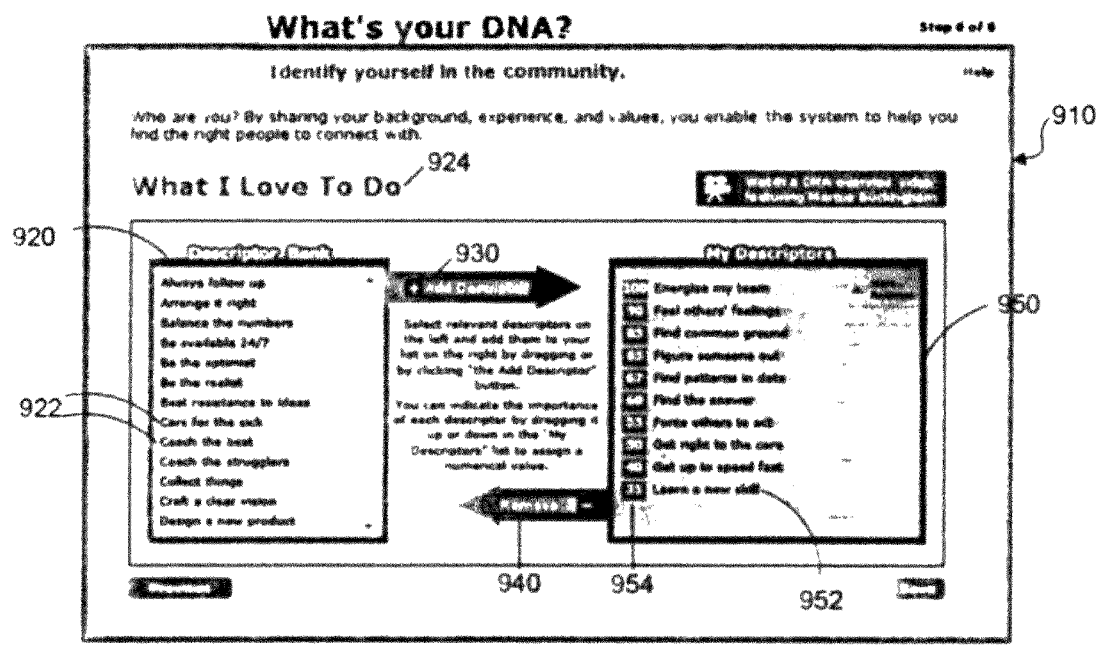

Referring now to FIG. 9, attribute-based server 110 may also display an attribute descriptor screen 910. Attribute descriptor screen 910 may include a general attribute descriptor bank 920, a descriptor submission button 930, a descriptor removal button 940, and a personal attribute descriptor area 950. General attribute descriptor bank 920 may include a list of pre-defined general attribute descriptors 922 for one or more different categories 924. The exemplary descriptor screen 910 of FIG. 9, however, illustrates descriptors for only one category ("What I love to do").

For each category 924, the user may review the corresponding general attribute descriptors 922 in the general attribute descriptor bank 920 and create one or more personal descriptors 952 by adding general descriptors 922 applicable to the user to the personal descriptor area 950. The user may add general descriptors 922 to the personal descriptor area 950 by dragging and dropping descriptors 922 from descriptor bank 920 to personal descriptor area 950 or by selecting the applicable descriptors 922 and selecting descriptor submission button 930. Personal descriptors 952 can be removed from personal descriptor area 950 by selecting descriptor removal button 940.

In addition, server 110 may display a numerical rating 954 associated with each personal descriptor 952. The user can modify rating 954 by a variety of methods, such as by dragging and dropping the personal descriptors 952 within the personal descriptor area. For example, personal descriptors 952 that are closer to the upper portion of descriptor bank 950 may be considered more relevant and may thus be assigned a higher rating, while personal descriptors 952 farther away from the upper portion of the descriptor bank 950 may be considered less relevant and thus assigned a lower rating. As another example, the user may modify rating 954 by selecting the rating 954 and inputting a new rating. While in the embodiment shown in FIG. 9 no two ratings 954 are the same, multiple descriptors can be giving the same rating. Moreover, while FIG. 9 illustrates the use of numerical ratings, systems consistent with the invention may use other types of ratings, such as alphabetical or symbolic ratings.

Figure 10:
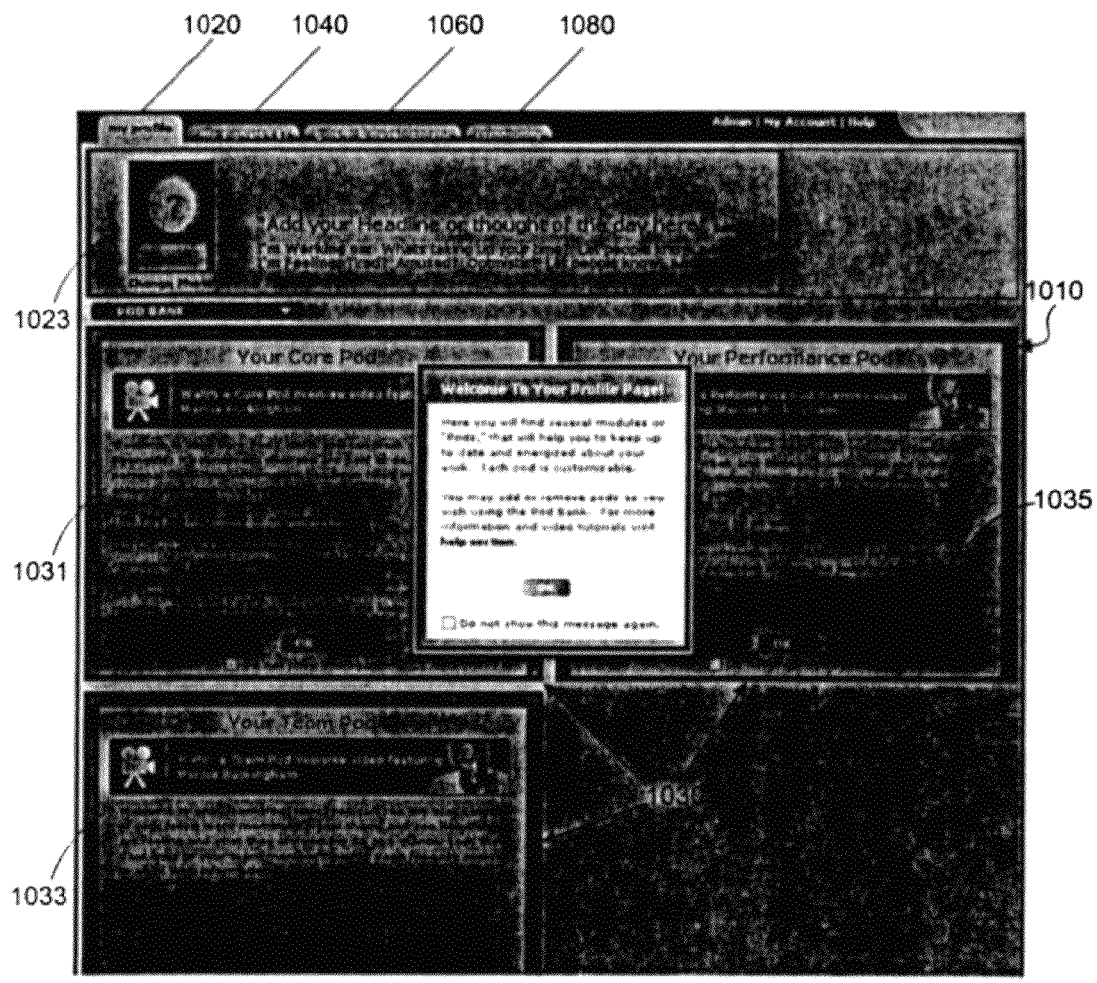

Referring now to FIG. 10, server 110 may display a display screen 1010 including information populated by one or more of modules 162, 164, 166, and 168, and/or by databases 172, 174, and 176. Information in display screen 1010 could also be created and/or edited directly by the user. Server 110 may divide display screen 1010 into more than one screen section. For example, display screen 1010 may be divided into screen sections such as a "My Profile" section 1020, a "Signals" section 1040, a "Growth and Development" section 1060, and a "Community" section 1080. The display module 169 may include in, for example, the "My Profile" section 1020, a statistical information area 1023 that includes information about the user, such as the user's name, title, location, and image.

Server 110 may also divide the screen sections into one or more screen sub-sections. For example, the "My Profile" section 1020 may also include one or more association areas 1030 that display information relating to other users of system 100 who are associated with the particular user. For example, the associations may be created by the users themselves, or may be set by an administrator. In the embodiment shown in FIG. 10, the association areas 1030 (such as Core Pod 1031, Team Pod 1033, and Performance Pod 1035) may be added, removed, and rearranged by the user. In addition to activating or deactivate multiple pods at once (provided that multiple pods have been made available to the user), a user can use server 110 to create new association areas 1030.

Figure 11A:
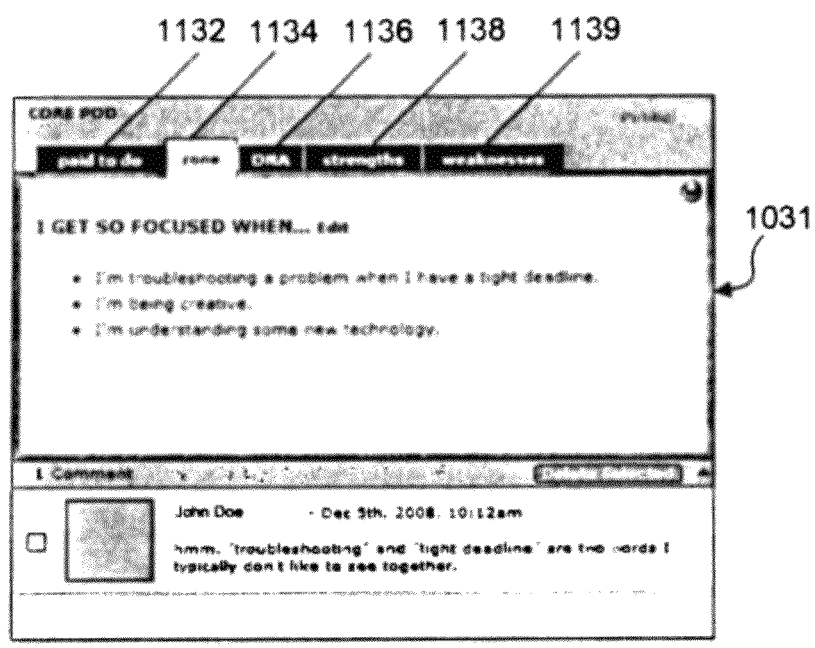
Figure 11B:
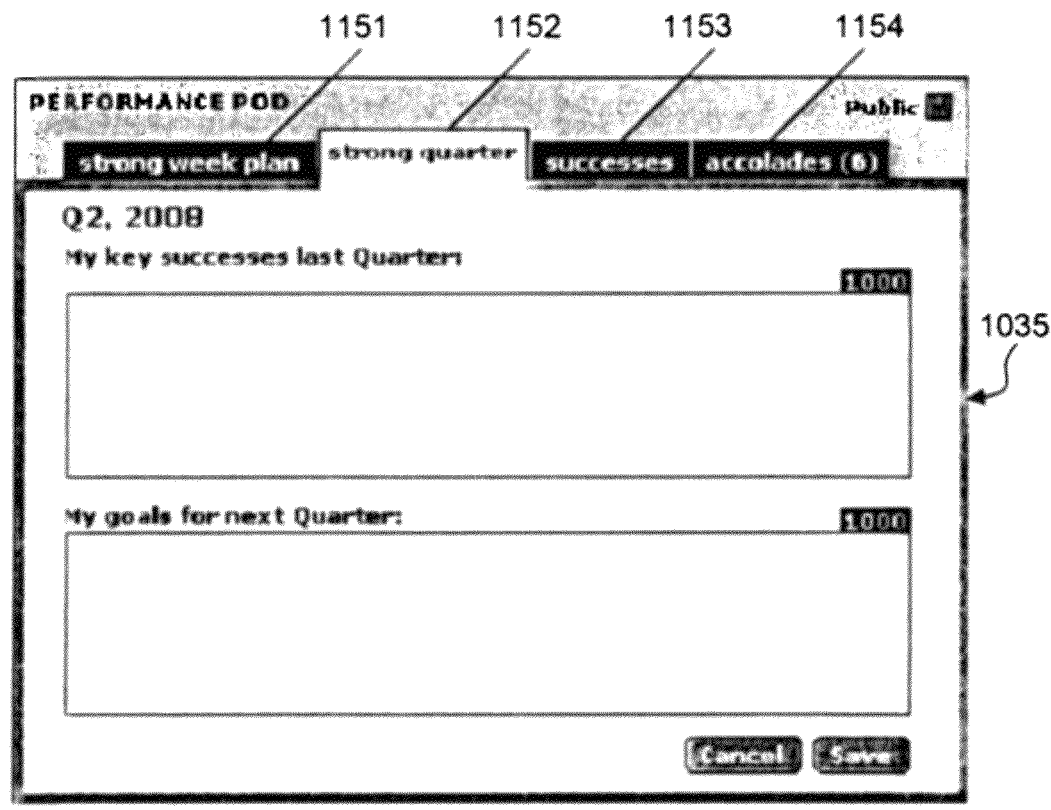
Figure 11C:
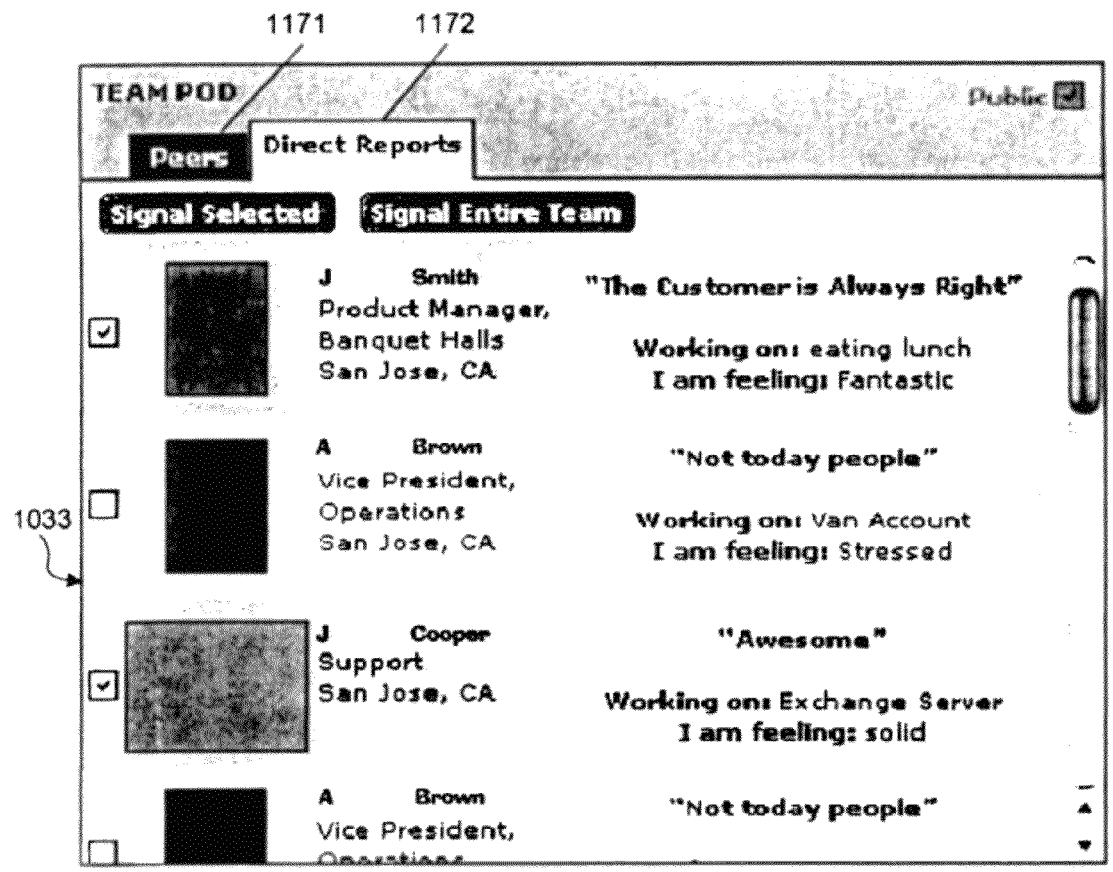

As shown in FIG. 11A, an association area 1030 (such as Core Pod 1031) may include several sub-areas 1132, 1134, 1136, 1138, and 1139 which include information about the user that can be populated by one or more of modules 162, 164, 166, and 168, and/or by databases 172, 174, and 176. In addition, the information could be inputted and/or edited directly by the user. For example, referring now to FIGS. 11A-C, the association area 1030 may include a "Paid to Do" area 1132, a "Zone" area 1134, a "DNA" area 1136, a "Strengths" area 1138, a "Weaknesses" area 1139, a "Strong Week Plan" area 1151, a "Strong Quarter" area 1152, a "Successes" area 1153, an "Accolades" area 1154, a "Peers" area 1171, and a "Direct Reports" area 1172.

The "Strong Week Plan" area 1151 may allow the user to create and edit one or more actions that the user will take during the week to leverage his or her strengths towards meeting his or her desired outcomes. Furthermore, the "Strong Quarter" area 1152 may allow the user to create and edit the successes the user accomplished during the previous quarter as well as the goals the user wishes to accomplish the following quarter. The "Successes" area 1153 may allow the user to create and edit information about the user's moments of success achieved utilizing the user's strengths. Additionally, the "Accolades" area 1154 may be an area where other users of attribute-based system 100 can write positive comments about the user.

The "Peers" area 1171 may contain information relating to a user's team members who are the user's peers, while the "Direct Reports" area 1172 may contain information relating to the user's team members who directly report to the user. Server 110 may also allow the user to signal one or more users of attribute-based system 100. A signal may be a short message sent, for example, within system 100 from user terminal 120-*a* to user terminal 120-*n*. Server 110 may display all of the signals sent and received by a user and may allow the user to compose new signals. In addition, server 110 may also provide the user with access to a library of articles, video, tips, and success stories. Users may view the content of the library or may add content to the library.

Figure 12:
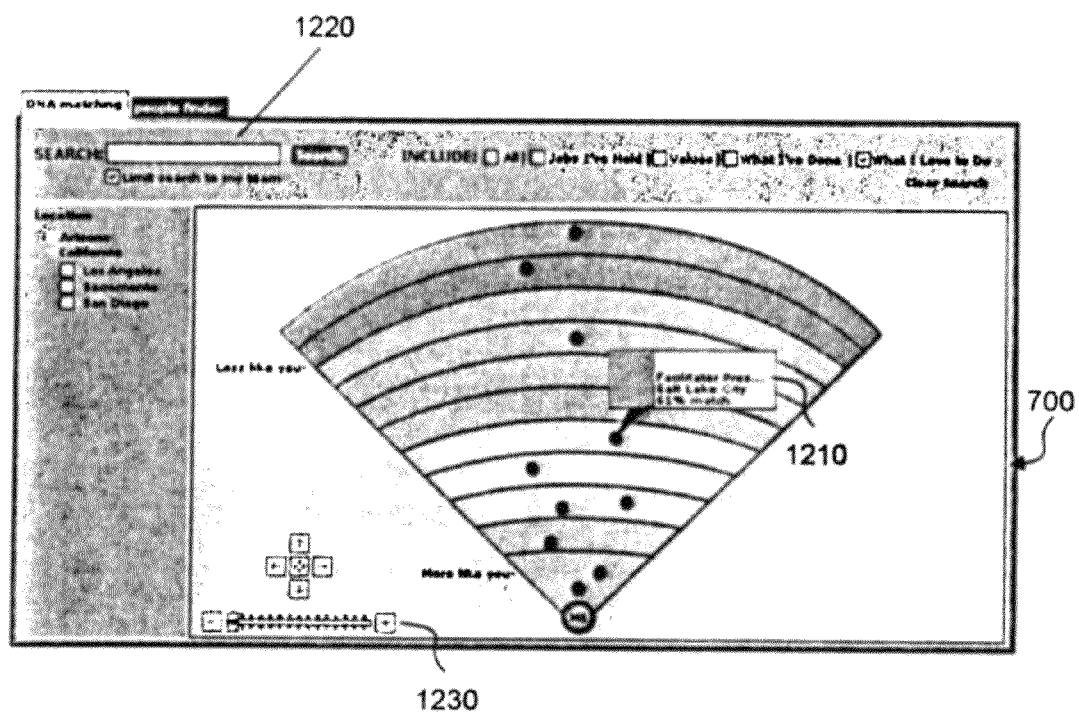

Referring now to FIG. 12, server 110 may also display an attribute proximity display 700 as discussed above. In the attribute proximity display 700 shown in FIG. 12, server 110 may overlay a preview version 1210 of the user's statistical information. Furthermore, server 110 may provide a search function 1220 to allow the user to search through the matches via a text search or by limiting the search to one or more categories. In addition, the particular user may instruct system 100 to search for other users based on individual criteria, such as office/location and duration with the company. Moreover, server 110 may provide a zoom function 1230 such that the user could focus more closely on certain areas of the attribute proximity display 700.

Each user's information may be visible to other users and/or a particular portion of a user's information, such as the user's signals, may be blocked from another user's view. In addition, attribute-based system 100 can archive the content of each module and display screen, as well as provide alerts to the user at predetermined time periods to remind the user to update his or her information.

As described above, systems and methods consistent with the invention provide an attribute-based system that allows an organization to manage the attributes or strengths of its members. For purposes of explanation only, certain aspects and embodiments are described herein with reference to the components illustrated in FIGS. 1A-12. The functionality of the illustrated components may overlap, however, and may be present in a fewer or greater number of elements and components. Further, all or part of the functionality of the illustrated elements may co-exist or be distributed among several geographically dispersed locations. Moreover, embodiments, features, aspects and principles of the present invention may be implemented in various environments and are not limited to the illustrated environments.

Further, the sequences of events described in FIGS. 1A-12 are exemplary and not intended to be limiting. Thus, other process stages may be used, and even with the processes depicted in FIGS. 1A-12, the particular order of events may vary without departing from the scope of the present invention. Moreover, certain process stages may not be present and additional stages may be implemented in FIGS. 1A-12. Also, the processes described herein are not inherently related to any particular system or apparatus and may be implemented by any suitable combination of components.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for matching user attributes comprising:
    means for storing predetermined general attribute descriptors reflecting attributes of users generally;

means for receiving personal attribute descriptors selected from the predetermined general attribute descriptors as corresponding to attributes of a first user and a second user;

means for receiving ratings associated with received personal attribute descriptors;

means for comparing at least one personal attribute descriptor associated with the first user with at least one personal attribute descriptor associated with the second user to determine a descriptor match;

means for calculating a match score based on the determined descriptor match and the received ratings;

means for displaying a first indicator corresponding to the first user at a first display point and displaying a second indicator corresponding to the second user at a second display point, wherein the first and second display points are separated by a one-dimensional display distance that is a function of the calculated match score; and means for creating at least one group of three or more users based on match scores, wherein a group is formed based on:
  personal descriptors associated with at least one task; and
  according to a degree to which personal descriptors of each user match those of each other user in the group.

2. The system of claim 1, wherein each personal attribute descriptor is associated with a respective attribute category, and wherein the system further includes:
  means for determining a match if the personal attribute descriptor associated with the first user is the same as the personal attribute descriptor associated with the second user and both descriptors are associated with a common category.

3. The system of claim 2, wherein the means for calculating a match further includes:
  means for calculating a match score for only personal attribute descriptors associated with the selected category.

4. The system of claim 1, wherein the means for calculating the match score further includes:
  means for calculating a match ratio based on a total number of determined descriptor matches in proportion to a total number of personal attribute descriptors associated with the first and second users; and
  means for calculating the match score based on the match ratio.

5. The system of claim 1, wherein the means for calculating the match score further includes:
  means for weighting the match score by a match weight value to account for different ratings of the personal attribute descriptors associated with the first and second users.

6. The system of claim 5, wherein the means for weighting the match score further includes:
  means for summing the match weight values for each descriptor match to determine a summed match weight value; and
  means for calculating a total match weight value based on the summed match weight value and a total number of personal attribute descriptors associated with the first and second users.

7. The system of claim 1, wherein the means for displaying further includes:
  means for displaying the first and second display points in an attribute proximity display which displays multiple user indicators in one-dimensional relation to the first indicator corresponding to the first user and at respective one-dimensional distances defined by the respective calculated match scores.

* * * * *

UNITED STATES PATENT AND TRADEMARK OFFICE
CERTIFICATE OF CORRECTION

| | | |
|---|---|---|
| PATENT NO. | : 8,688,707 B2 | Page 1 of 1 |
| APPLICATION NO. | : 13/193965 | |
| DATED | : April 1, 2014 | |
| INVENTOR(S) | : James Edward Marshall et al. | |

It is certified that error appears in the above-identified patent and that said Letters Patent is hereby corrected as shown below:

Title Page:

Item (73), "Accenture Global Services GmbH (CH)" should read as --Accenture Global Service Limited (IE)--.

Signed and Sealed this
Eighteenth Day of August, 2015

Michelle K. Lee
*Director of the United States Patent and Trademark Office*